US012612168B2

(12) United States Patent
Saudel et al.

(10) Patent No.: US 12,612,168 B2
(45) Date of Patent: Apr. 28, 2026

(54) AIRCRAFT AIR INLET COMPRISING AT LEAST A MAIN DE-ICING SYSTEM AND AT LEAST ONE SECONDARY DE-ICING SYSTEM POSITIONED AT A SPLICE PLATE

(71) Applicant: Airbus Operations SAS, Toulouse (FR)

(72) Inventors: Brice Saudel, Toulouse (FR); Grégoire Smith, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/061,304

(22) Filed: Feb. 24, 2025

(65) Prior Publication Data

US 2025/0269968 A1     Aug. 28, 2025

(30) Foreign Application Priority Data

Feb. 28, 2024     (FR) ........................................ 2401962

(51) Int. Cl.
B64D 15/12          (2006.01)
(52) U.S. Cl.
CPC .................................... B64D 15/12 (2013.01)
(58) Field of Classification Search
CPC . B64D 15/12; B64D 15/02; B64D 2033/0233
See application file for complete search history.

(56) References Cited

U.S. PATENT DOCUMENTS

| | | | |
|---|---|---|---|
| 2005/0236522 A1 | 10/2005 | Jopp et al. | |
| 2010/0038475 A1 * | 2/2010 | Zecca | B64D 33/02 |
| | | | 244/1 N |
| 2011/0138578 A1 | 6/2011 | Premazzi et al. | |
| 2011/0167781 A1 * | 7/2011 | Maheshwari | B64D 15/12 |
| | | | 977/902 |
| 2013/0037655 A1 | 2/2013 | Bradley et al. | |
| 2014/0199170 A1 | 7/2014 | Madsen et al. | |
| 2020/0115030 A1 | 4/2020 | Evans et al. | |
| 2021/0031929 A1 * | 2/2021 | Goodfellow Jones | |
| | | | H05B 3/267 |
| 2021/0078717 A1 | 3/2021 | Porte et al. | |
| 2024/0166358 A1 * | 5/2024 | Zuzelski | B64D 41/00 |

FOREIGN PATENT DOCUMENTS

| | | |
|---|---|---|
| CA | 2839736 A1 | 7/2014 |
| EP | 1588941 A2 | 10/2005 |
| FR | 3136506 A1 | 12/2023 |
| WO | 2009138833 A2 | 11/2009 |

OTHER PUBLICATIONS

French Search Report for corresponding French Patent Application No. 2401962 dated Aug. 13, 2024.

* cited by examiner

*Primary Examiner* — Rodney A Bonnette
(74) *Attorney, Agent, or Firm* — Greer, Burns & Crain Ltd.

(57)          ABSTRACT

An air inlet of an aircraft propulsion assembly, comprising a lip which includes juxtaposed panels connected by at least one splice plate. This air inlet combines a main de-icing system and at least one secondary de-icing system which includes at least a main layer, which is made of a thermally conductive material and comprises a through-opening for each fixing element passing therethrough, the main layer being interposed at least partially between the splice plate and at least one of the first and second panels.

11 Claims, 12 Drawing Sheets

AIRCRAFT AIR INLET COMPRISING AT LEAST A MAIN DE-ICING SYSTEM AND AT LEAST ONE SECONDARY DE-ICING SYSTEM POSITIONED AT A SPLICE PLATE

CROSS-REFERENCES TO RELATED APPLICATIONS

This application claims the benefit of French Patent Application Number 2401962 filed on Feb. 28, 2024, the entire disclosure of which is incorporated herein by way of reference.

FIELD OF THE INVENTION

The present application relates to an aircraft air inlet comprising at least a main de-icing system and at least one secondary de-icing system positioned at a splice plate, and to an aircraft including at least one such air inlet.

BACKGROUND OF THE INVENTION

According to an embodiment shown in FIG. 1, an aircraft 10 comprises a fuselage 12, wings 14 which are positioned on either side of the fuselage 12, and propulsion assemblies 16 which are positioned under the wings 14 and are connected to the latter by pylons 18. Each propulsion assembly 16 comprises a drive system and a nacelle 20, which is positioned around the drive system and has an air inlet 22 at the front.

According to an embodiment shown in FIGS. 2 and 3, the air inlet 22 comprises a lip 24 which is C-shaped in a longitudinal sectional plane passing through the axis of the drive system. The lip 24 comprises a leading edge 24.1 which splits an air flow 26 into an inner air flow 26.1 and an outer air flow 26.2, an outer portion 24.2 which extends from the leading edge 24.1 to an outer rear edge of the lip 24 and over which the outer air flow 26.2 flows, and an inner portion 24.3 which extends from the leading edge 24.1 to an inner rear edge of the lip 24 and over which the inner air flow 26.1 flows. The lip 24 has an outer surface F24, which is in contact with the inner and outer air flows 26.1, 26.2, and an inner surface F24' opposing the outer surface F24.

The air inlet 22 also comprises an annular frame 28 which has an outer edge 28.1 connected to the outer portion 24.2 of the lip 24, and an inner edge 28.2 connected to the inner portion 24.3 of the lip 24, the annular frame 28 and the lip 24 delimiting an annular duct 30, referred to as the D-duct, which extends over the entire periphery of the air inlet 22.

Depending on the weather conditions and the flight phases, frost or ice may form on the outer surface F24 of the lip 24. In order to optimize flight conditions, it is necessary to remove this frost or ice, or limit or prevent the formation of frost or ice. For this purpose, the propulsion assembly 16 comprises a pneumatic de-icing system configured to inject hot air into the annular duct 30.

According to an embodiment shown in FIG. 4, the lip 24 comprises a plurality of juxtaposed panels 32, 32' and at least one splice plate 34, which connects the panels 32, 32' and is positioned against the inner surface F24'. The lip 24 thus has a first thickness E1 outside the regions covered by the splice plates 34 and a second thickness E2, greater than the first thickness E1, in line with the regions covered by the splice plates 34.

When the pneumatic de-icing system is activated, since the lip 24 does not have a homogeneous thickness, the outer surface F24 of the lip 24 exhibits non-homogeneous temperatures; a first temperature outside the regions covered by the splice plates 34, and a second temperature, lower than the first temperature, in line with the regions covered by the splice plates 34. The temperature of the air injected into the annular duct 30 is set so that the first temperature is suitable for de-icing. Since the second temperature is lower than the first temperature, it is not optimized for de-icing, and therefore de-icing is not optimal over the entire outer surface F24 of the air inlet 24.

SUMMARY OF THE INVENTION

An object of the present invention is to remedy some or all of the disadvantages of the prior art.

For this purpose, the invention relates to an air inlet of an aircraft propulsion assembly, comprising a lip and a main de-icing system configured to at least partially de-ice the lip, said lip including:

a. at least first and second panels having inner and outer faces, b. at least one splice plate, which is positioned to straddle the first and second panels, extends between first and second lateral edges and has a contact face including a first part facing a first region of the inner face of the first panel, and a second part facing a second region of the inner face of the second panel, and, c. fixing elements connecting the splice plate and the first and second panels.

According to the invention, the air inlet comprises at least one secondary de-icing system which includes at least one heat exchanger comprising at least a main layer, which is made of a thermally conductive material and comprises a through-opening for each fixing element passing therethrough, said main layer being interposed at least partially between the splice plate and at least one of the first and second panels.

The secondary de-icing system makes it possible to compensate for the reduction in the de-icing or anti-ice capacity of the main de-icing system caused by the increase in the thickness of the lip in line with each splice plate, and to achieve a homogeneous de-icing or anti-ice capacity over the entire outer surface of the lip.

According to another feature, each connecting element has a rod which passes through the splice plate and the first or second panel. In addition, each through-opening has a cross section greater than that of the rod of the fixing element which passes therethrough, the through-opening and the rod being arranged in such a way that there remains a gap all around the rod between the main layer and the rod, each fixing element being electrically insulated from the main layer.

According to another feature, the main layer has opposing first and second faces. In addition, the heat exchanger comprises at least first and second secondary layers, between which the main layer is positioned and which completely cover the opposing first and second faces of the main layer, the secondary layers being made of a material which is at least electrically insulating.

According to another feature, the secondary de-icing system comprises at least one heating body, which is positioned outside the first and second regions covered by the splice plate and is configured to convert electrical energy into thermal energy, and at least one thermal connection configured to transfer thermal energy from the heating body to the heat exchanger.

According to another feature, the heating body comprises at least one electrical resistor, a matrix, which is made of an electrically insulating material and in which the electrical resistor is embedded, and at least one electrical connector configured to connect the electrical resistor to a power supply.

According to another feature, the heating body and the heat exchanger form a single flexible or semi-rigid plate configured to adapt to the curvature of the lip.

According to another feature, the secondary de-icing system extends between first and second edges, the heat exchanger extending between the first edge and a separating boundary, the heating body extending between the separating boundary and the second edge, the heat exchanger having a width greater than or equal to that of the first or second region covered by the splice plate.

According to another feature, the air inlet comprises a first secondary de-icing system interposed between the splice plate and the first panel, and a second secondary de-icing system interposed between the splice plate and the second panel.

According to another feature, the secondary de-icing system comprises first and second heating bodies, which are positioned on either side of the splice plate, and at least one heat exchanger positioned between the first and second heating bodies.

According to another feature, the main layer is a strip configured to convert electrical energy into thermal energy, the secondary de-icing system comprising at least one electrical energy supply configured to supply electrical energy to the main layer.

The invention also relates to an aircraft comprising at least one air inlet according to one of the preceding features.

BRIEF DESCRIPTION OF THE DRAWINGS

Other features and advantages will become apparent from the following description of the invention, this description being provided solely by way of example, with reference to the appended drawings, in which.

DETAILED DESCRIPTION OF THE PREFERRED EMBODIMENTS

Figure 1:
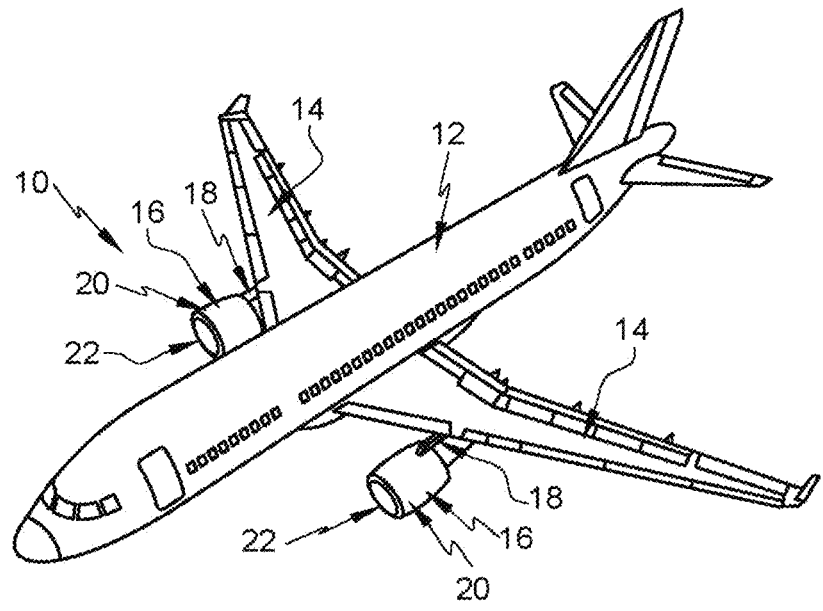
FIG. 1 is a perspective view of an aircraft.
Figure 2:
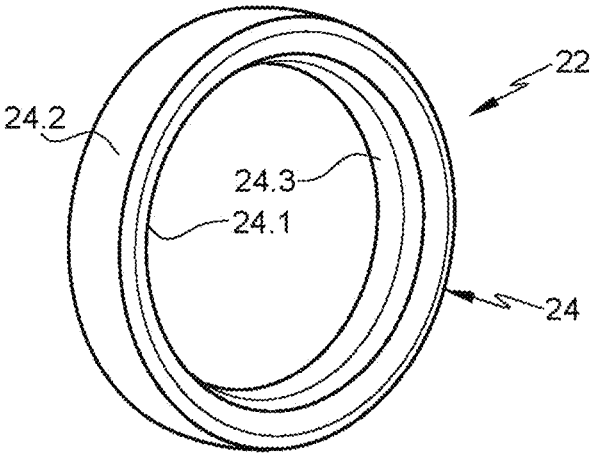
FIG. 2 is a perspective view of an air inlet.
Figure 3:
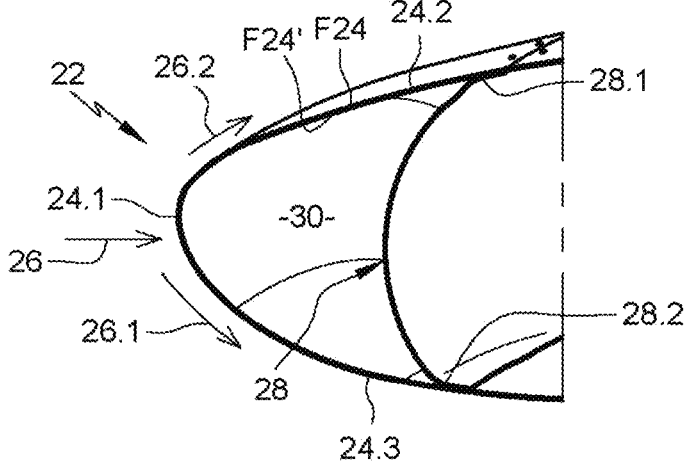
FIG. 3 is a longitudinal section of a part of an air inlet, illustrating an embodiment of the prior art.
Figure 4:
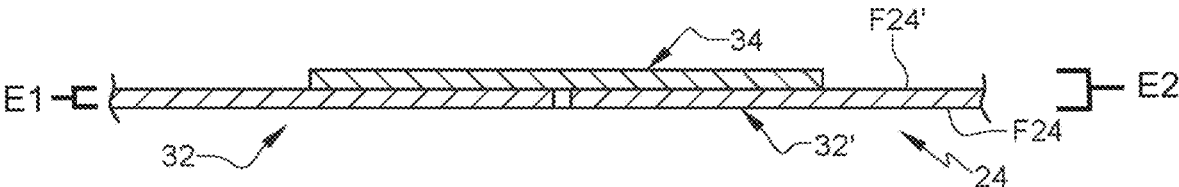
FIG. 4 is a cross section of a part of an air inlet, illustrating an embodiment of the prior art.
Figure 5:
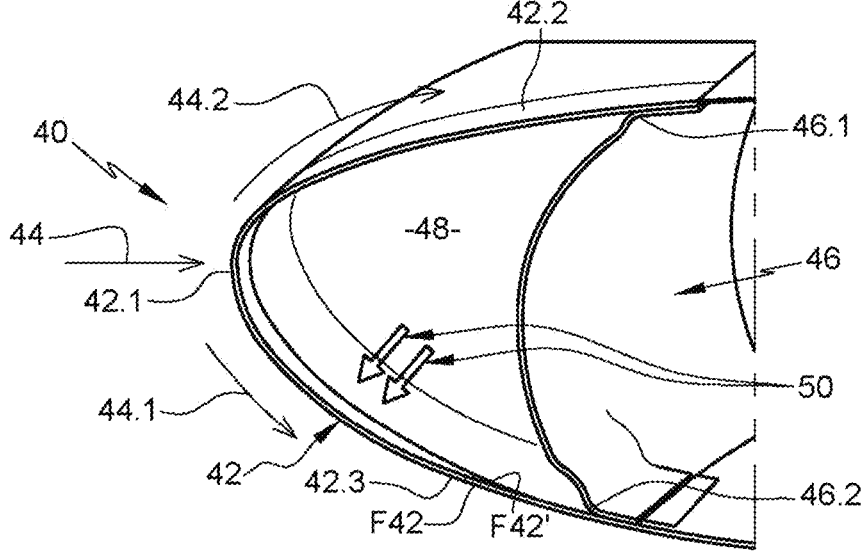
FIG. 5 is a longitudinal section of a part of an air inlet, illustrating an embodiment of the invention.

According to an embodiment shown in FIG. 5, an air inlet 40 comprises a lip 42 which is C-shaped in a longitudinal sectional plane passing through the axis of the drive system. The lip 42 comprises a leading edge 42.1 which splits an air flow 44 into an inner air flow 44.1 and an outer air flow 44.2, an outer portion 42.2 which extends from the leading edge 42.1 to an outer rear edge of the lip 42 and over which the outer air flow 44.2 flows, and an inner portion 42.3 which extends from the leading edge 42.1 to an inner rear edge of the lip 42 and over which the inner air flow 44.1 flows. The lip 42 has an outer surface F42, which is in contact with the inner and outer air flows 44.1, 44.2, and an inner surface F42' opposing the outer surface F42.

The air inlet 40 also comprises an annular frame 46, which has an outer edge 46.1 connected to the outer portion 42.2 of the lip 42, and an inner edge 46.2 connected to the inner portion 42.3 of the lip 42, the annular frame 46 and the lip 42 delimiting an annular duct 48, referred to as the D-duct, which extends over the entire periphery of the air inlet 40.

According to one application, an aircraft comprises at least one propulsion assembly which has an air inlet 40 at the front.

Regardless of the embodiment, the air inlet 40 comprises a main de-icing system 50, which may be pneumatic or electrical and is configured to at least partially de-ice the lip 42. In the case of an electrical main de-icing system, the air inlet 40 may not comprise a front frame 46 or an annular duct 48.

Figure 6:
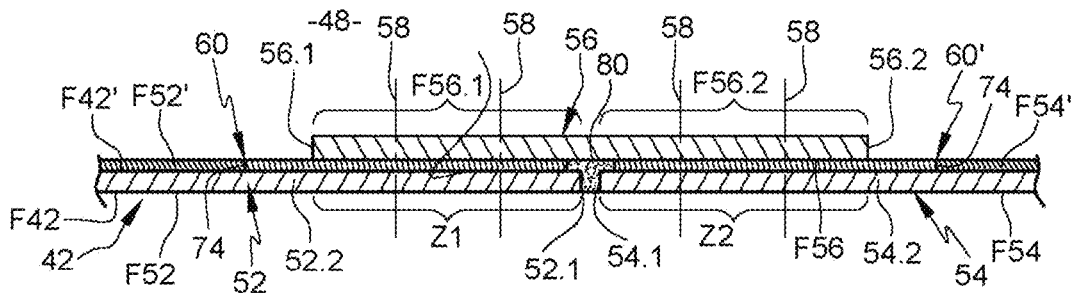
FIG. 6 is a cross section of a part of an air inlet, illustrating an embodiment of the invention.
Figure 7:
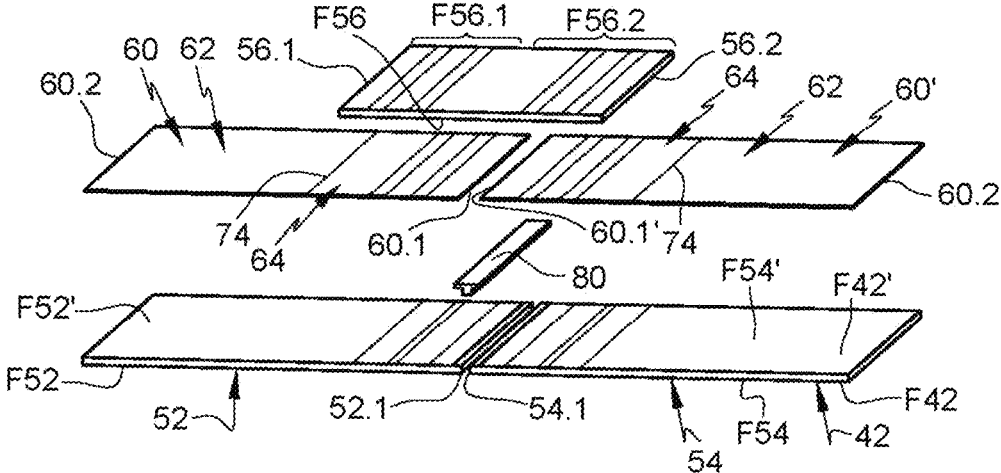
FIG. 7 is an exploded view of the part of the air inlet shown in FIG. 6.
Figure 8:
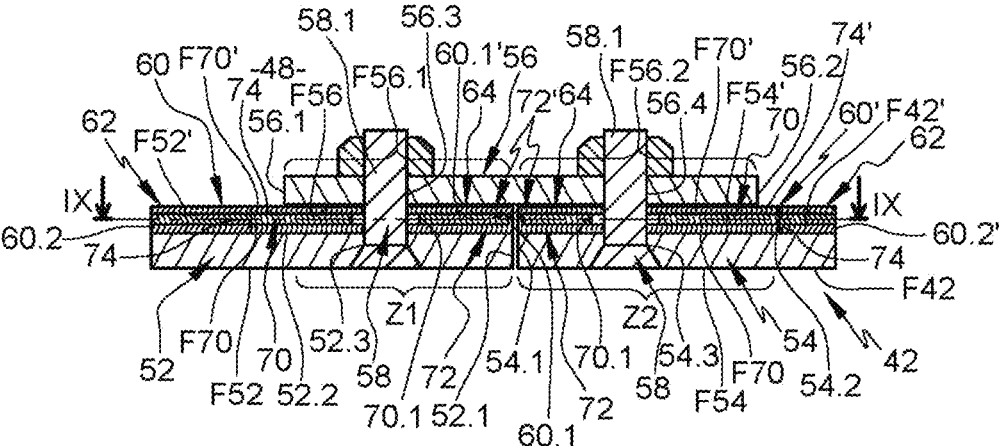
FIG. 8 is a cross section of a part of an air inlet, illustrating another embodiment of the invention.
Figure 9:
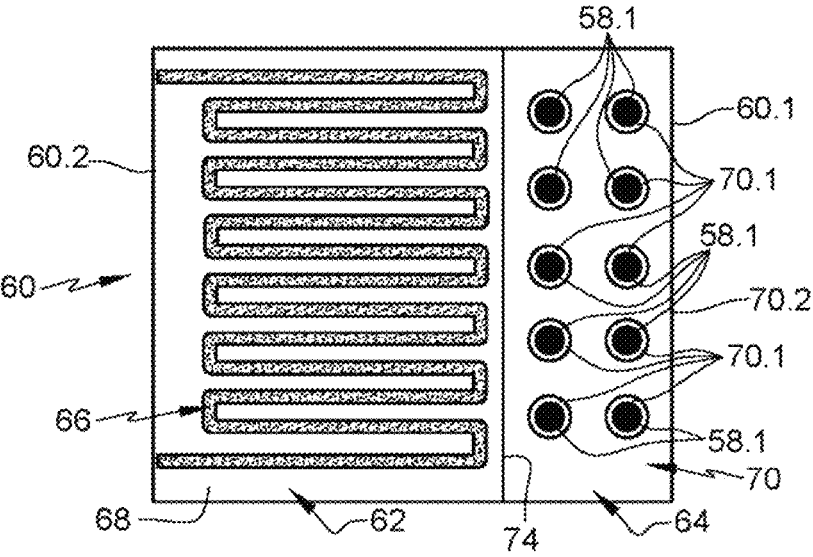
FIG. 9 is a section along the line IX-IX in FIG. 8.

As illustrated in FIGS. 6 to 8, the lip 42 comprises at least first and second panels 52, 54 having first and second juxtaposed borders 52.1, 54.1, the first and second panels 52, 54 each including an outer face F52, F54 corresponding to the outer surface F42 of the lip 42 and an inner face F52', F54' corresponding to the inner surface F42' of the lip 42. The lip 42 also comprises at least one splice plate 56, which is positioned to straddle the first and second panels 52, 54, extends between first and second lateral edges 56.1, 56.2 and has a contact face F56 including a first part F56.1 facing a first region Z1 of the inner face F52' of the first panel 52, and a second part F56.2 facing a second region Z2 of the inner face F54' of the second panel 54, and also comprises fixing elements 58 connecting the first and second panels 52, 54 and the splice plate 56. Each fixing element 58 comprises a rod 58.1 which passes through the first or second panel 52, 54 and the splice plate 56.

The first region Z1 covered by the first part F56.1 of the splice plate 56 extends between the first border 52.1 and a first boundary 52.2 (which is substantially parallel to the first border 52.1) and has a first width corresponding to the distance separating the first border 52.1 and the first boundary 52.2. At the same time, the second region Z2 covered by the second part F56.2 of the splice plate 56 extends between the second border 54.1 and a second boundary 54.2 (which is substantially parallel to the second border 54.1) and has a second width corresponding to the distance separating the second border 54.1 and the second boundary 54.2. According to one embodiment, the first and second widths are substantially equal.

According to one embodiment, each fixing element 58 is a bolt or a rivet. Of course, the invention is not limited to this embodiment in respect of the fixing elements 58.

Fixing elements 58 pass through the first panel 52 and the splice plate 56. In each case, the first panel 52 and the splice plate 56 comprise through-holes 52.3, 56.3 for the rod 58.1 of the fixing element 58. Fixing elements 58 pass through the second panel 54 and the splice plate 56. In each case, the second panel 54 and the splice plate 56 comprise through-holes 54.3, 56.4 for the rod 58.1 of the fixing element 58. Each of the through-holes 52.3, 54.3, 56.3, 56.4 has a diameter equal to or slightly greater than the rod 58.1 of the fixing element 58.

According to one configuration, the first and second panels 52, 54 and the splice plate 56 are metallic. Of course, the invention is not limited to this material. The first and second panels 52, 54 and the splice plate 56 are produced from a material with high thermal conductivity.

According to a first embodiment, the air inlet 40 comprises, for at least one splice plate 56, at least one electrical (operating by Joule heating) secondary de-icing system 60, which includes at least one heating body 62 positioned, in the vicinity of the splice plate 56, outside the first and second regions Z1, Z2 covered by the splice plate 56, and also at least one heat exchanger 64, which is connected by at least one thermal connection to the heating body 62 and is interposed at least partially between the splice plate 56 and at least one of the first and second panels 52, 54, i.e. in at least one of the first and second regions Z1, Z2 covered by the splice plate 56.

The thermal connection makes it possible to transfer thermal energy from the heating body 62 to the heat exchanger 64.

The heating body 62 and the heat exchanger 64 form a single flexible or semi-rigid plate configured to adapt to the curvature of the lip 42. This plate has a thickness smaller than that of the first or second panel 52, 54 or than that of the splice plate 56. According to one configuration, the heating body 62 and the heat exchanger 64 form a mat.

According to one embodiment, the heating body 62 comprises at least one electrical resistor 66, a matrix 68, which is made of an electrically insulating, heat-resistant material that may or may not be thermally conductive and in which the electrical resistor 66 is embedded, and at least one electrical connector configured to connect the electrical resistor 66 to a power supply. The heating body 62 is not described further as it may be identical to a heater mat in the prior art. Regardless of the embodiment, the heating body 62 is configured to convert electrical energy into thermal energy.

The heat exchanger 64 comprises at least a main layer 70, which is made of a thermally conductive material, is connected to the heating body 62 and has a through-opening 70.1 for the rod 58.1 of each fixing element 58 passing therethrough. This main layer 70 has opposing first and second faces F70, F70'. The heat exchanger 64 comprises at least one connection between the main layer 70 and the heating body 62, this connection making it possible to transfer thermal energy from the heating body 62 to the main layer 70.

According to one configuration, each through-opening 70.1 has a cross section greater than that of the rod 58.1 of the fixing element 58 which passes therethrough, the through-opening 70.1 and the rod 58.1 being arranged in such a way that there remains a gap all around the rod 58.1 between the latter and the main layer 70. The fixing elements 58 are thus not in contact with the layer 70. They are substantially electrically insulated, preferably electrically and thermally insulated, from the latter.

According to one embodiment, the heat exchanger 64 comprises, in addition to the main layer 70, at least first and second secondary layers 72, 72', between which the main layer 70 is positioned and which completely cover the opposing first and second faces F70, F70' of the main layer 70. According to one configuration, the main layer 70 has an edge 70.2 remote from the heating body 62, the first and second secondary layers 72, 72' being joined at said edge 70.2 so as to cover and electrically insulate the latter.

According to one configuration, the secondary layers 72, 72' are made of a material which is at least electrically insulating.

According to a preferred embodiment, the heat exchanger 64 is configured to maintain a constant thickness over time in order to limit the risks of loosening or reduction of the tightening torque of each fixing element 58.

According to an embodiment shown in FIGS. 6 to 9, the secondary de-icing system 60 extends between first and second edges 60.1, 60.2 and comprises a heating body 62 and a heat exchanger 64, which is separated from the heating body 62 by a separating boundary 74. The heat exchanger 64 thus extends between the separating boundary 74 and the first edge 60.1 and has a substantially constant width, which is greater than or equal to that of the first or second region Z1, Z2, covered by the splice plate 56, of the first or second panel 52, 54. In addition, the heating body 62 extends between the separating boundary 74 and the second edge 60.2 and has a substantially constant width.

According to one application, the air inlet 40 comprises:

a. a first secondary de-icing system 60, which is interposed between the splice plate 56 and the first panel 52 and comprises a first edge 60.1, which is approximately vertically aligned with the first border 52.1 of the first panel 52, and a separating boundary 74, which is substantially vertically aligned with the first lateral edge 56.1 of the splice plate 56 or is located outside the first region Z1, b. a second secondary de-icing system 60', which is interposed between the splice plate 56 and the second panel 54 and comprises a first edge 60.1, which is approximately vertically aligned with the second border 54.1 of the second panel 54, and a separating boundary 74', which is substantially vertically aligned with the second lateral edge 56.2 of the splice plate 56 or is located outside the second region Z2.

According to one arrangement, the heat exchanger 64 of each secondary de-icing system 60, 60' is dimensioned to cover at least the entire first or second region Z1, Z2, covered by the splice plate 56, of the first or second panel 52, 54. According to one embodiment, the heat exchanger 64 of each secondary de-icing system 60, 60' is dimensioned to extend beyond the first or second region Z1, Z2, covered by the splice plate 56, of the first or second panel 52, 54.

Figure 10:
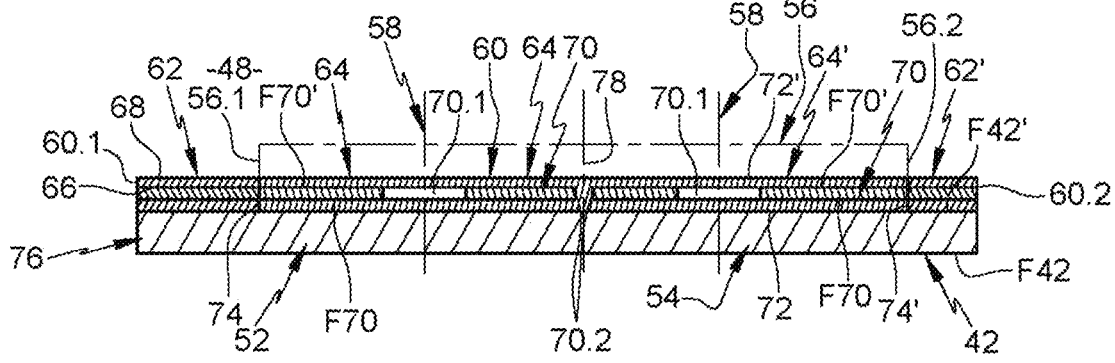
FIG. 10 is a cross section of a panel and a secondary de-icing system, illustrating an embodiment of the invention.

According to another embodiment shown in FIG. 10, the secondary de-icing system 60 extends between first and second edges 60.1, 60.2 and comprises first and second heating bodies 62, 62', which are positioned on either side of the splice plate 56, and at least one heat exchanger 64, which is positioned between the first and second heating bodies 62, 62' and is separated from the latter by first and second separating boundaries 74, 74' respectively, these being located so as to be vertically aligned with the first and second lateral edges 56.1, 56.2 of the splice plate 56 or outside the first and second regions Z1, Z2 of the first and second panels 52, 54. According to one configuration, the secondary de-icing system 60 comprises first and second heat exchangers 64, 64', which are positioned between the first and second heating bodies 62, 62' and are connected to the first and second heating bodies 62, 62' respectively. According to one application, the heat exchanger(s) 64, 64' is(are) positioned between the splice plate 56 and the first and second panels 52, 54, the first and second separating boundaries 74, 74' being positioned so as to be substantially vertically aligned with the first and second lateral edges

56.1, 56.2 of the splice plates 56 or outside the first and second regions Z1, Z2, covered by the splice plate 56, of the first and second panels 52, 54.

According to a first procedure, with separate first and second panels 52, 54, the first and second secondary de-icing systems 60, 60' are positioned and fixed against the inner faces F52', F54' respectively of the first and second panels 52, 54. The splice plate 56 is subsequently positioned against the first and second secondary de-icing systems 60, 60' and then connected to the first and second panels 52, 54 by the fixing elements 58.

According to a second procedure, the first and second panels 52, 54 form a single panel 76 on which the first and second secondary de-icing systems 60, 60', which are joined and form a single unit, are positioned and fixed. This sub-assembly is subsequently cut along a cutting line 78 so as to form the separate first and second panels 52, 54, each provided with a secondary de-icing system 60, 60'. Next, the splice plate 56 is positioned against the first and second secondary de-icing systems 60, 60' and then connected to the first and second panels 52, 54 by the fixing elements 58.

Of course, the invention is not limited to these assembly procedures.

Following the assembly of the first and second panels 52, 54, splice plates 56 and secondary de-icing systems 60, 60', there may be a gap between the first and second panels 52, 54 and the secondary de-icing systems 60. In this case, a filling material 80, such as putty for example, is applied to fill this gap.

According to one configuration, the air inlet 40 comprises at least one secondary de-icing system 60 for each splice plate 56.

Regardless of the embodiment, each secondary de-icing system 60 makes it possible to compensate for the reduction in the de-icing or anti-ice capacity of the main de-icing system 50 caused by the increase in the thickness of the lip 42 in line with each splice plate 56. The de-icing or anti-ice capacity of the lip 42 is thus homogeneous over the entire outer surface F42 of the lip 42. Regardless of the embodiment, the main and secondary de-icing systems 50, 60 are positioned at a constant distance from the outer surface F42 of the lip 42.

Regardless of the embodiment, the heat exchanger 64 comprises at least a main layer 70, which is made of a thermally conductive material and comprises a through-opening 70.1 for the rod 58.1 of each fixing element 58 passing therethrough, said main layer 70 being interposed at least partially between the splice plate 56 and at least one of the first and second panels 52, 54 to transfer heat towards the first and second regions Z1, Z2, covered by the splice plate 56, of the first and second panels 52, 54. The main layer 70 is configured to withstand compressive stresses generated by the fixing elements 58 connecting the splice plate 56 and the first and second panels 52, 54.

According to a first embodiment shown in FIGS. 6 to 10, the heat exchanger 64 is a passive element and does not generate heat itself. According to this first embodiment, the secondary de-icing system 60 comprises at least one heating body 62, which is not covered by the splice plate 56 and is configured to convert electrical energy into thermal energy, and also a connection, which connects the heating body 62 and the heat exchanger 64 and is configured to transfer heat between the heating body 62 and the heat exchanger 64, the latter being configured to transmit this electrical energy towards the first and second regions Z1, Z2, covered by the splice plate 56, of the first and second panels 52, 54. In each secondary de-icing system 60, the heating body 62, which provides the heat energy, is offset relative to the splice plate 56, and this limits the risks of said heating body 62 being damaged during assembly due to potentially being crushed between the splice plate 56 and the first or second panel 52, 54. Only the heat exchanger 64, which transfers heat energy between the heating body 62 and the region of the splice plate 56 and does not have any electrical resistors 66 or similar elements, is interposed between the splice plate 56 and the first and second panels 52, 54.

Figure 11:
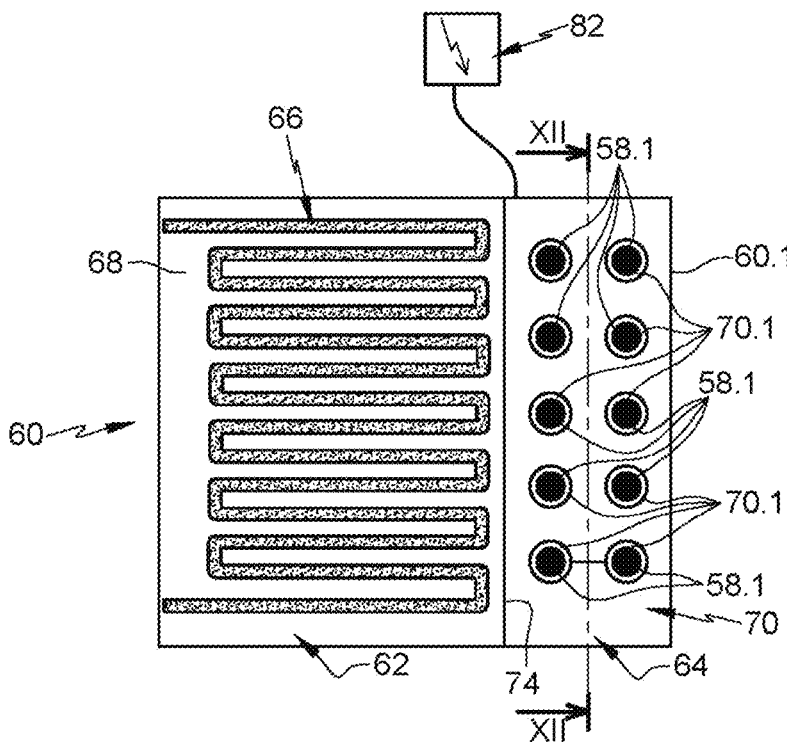
FIG. 11 is a section in a plane parallel to a lip of an air inlet, illustrating another embodiment of the invention, and, FIG. 12 is a section along the line XII-XII in FIG. 11.
Figure 12:
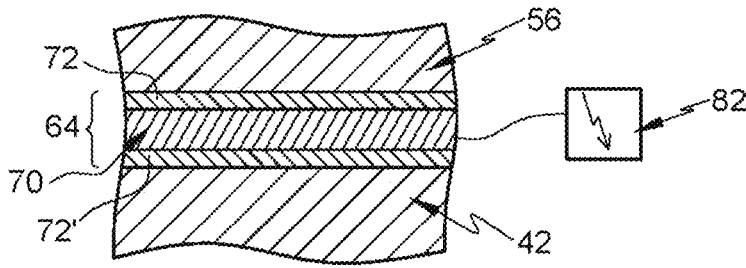

According to a second embodiment shown in FIGS. 11 and 12, the heat exchanger 64 comprises at least an active layer 70, such as a metal strip, which is configured to convert electrical energy into thermal energy and transmit the latter towards the first and second regions Z1, Z2, covered by the splice plate 56, of the first and second panels 52, 54. Unlike a heating body 62 which includes resistors and has relatively limited compressive strength, a strip has relatively high compressive strength, which allows it to withstand the compressive stresses, generated by the fixing elements 58, between the splice plate 56 and the first and second panels 52, 54. According to one arrangement, the heat exchanger 64 comprises first and second secondary layers 72, 72', which are made of an electrically insulating material and between which the active layer 70 is positioned, the latter being electrically insulated from the splice plate 56 and the first and second panels 52, 54 by the first and second secondary layers 72, 72'. According to this embodiment, the secondary de-icing system 60 comprises at least one electrical energy supply 82 connected to the active layer 70.

According to a first configuration, the active layer 70 is supplied solely with electrical energy by at least one electrical energy supply 82, said electrical energy being converted by the active layer 70 into thermal energy which the latter transmits towards the first and second regions Z1, Z2, covered by the splice plate 56, of the first and second panels 52, 54.

According to a second configuration shown in FIG. 11, the active layer 70 is supplied with electrical energy by at least one electrical energy supply 82 and with thermal energy by at least one heating body 62, the active layer 70 transmitting the thermal energy received or generated towards the first and second regions Z1, Z2, covered by the splice plate 56, of the first and second panels 52, 54.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air inlet of an aircraft propulsion assembly, the air inlet comprising:
   a lip, and
   a main de-icing system configured to at least partially de-ice the lip,
   said lip including first and second panels, each panel having an inner face and an outer face, at least one splice plate, which is positioned to straddle the first and second panels and which extends between first and second lateral edges and has a contact face including a first part facing a first region of the inner face of the first panel, and a second part facing a second region of the inner face of the second panel, said lip also comprising fixing elements connecting the splice plate and the first or second panels, and wherein the air inlet further comprises at least one secondary de-icing system which includes at least one heat exchanger comprising a main layer, which is made of a thermally conductive material and comprises a through-opening for each fixing element passing therethrough, said main layer being interposed at least partially between the splice plate and at least one of the first and second panels.

2. The air inlet according to claim 1, wherein each fixing element has a rod which passes through the splice plate and the first or second panel, wherein each through-opening has a cross section greater than that of a rod of the fixing element which passes therethrough, the through-opening and the rod being arranged in such a way that a gap is provided all around the rod between the main layer and the rod, and, each fixing element being electrically insulated from the main layer.

3. The air inlet according to claim 1, wherein the main layer has opposing first and second faces, and wherein the heat exchanger comprises first and second secondary layers, between which the main layer is positioned and which completely cover the opposing first and second faces of the main layer, the first and second secondary layers being made of a material which is electrically insulating.

4. The air inlet according to claim 1, wherein the at least one secondary de-icing system comprises at least one heating body, which is positioned outside the first and second regions covered by the splice plate and is configured to convert electrical energy into thermal energy, and wherein the secondary de-icing system comprises at least one thermal connection configured to transfer thermal energy from the at least one heating body to the heat exchanger.

5. The air inlet according to claim 4, wherein the at least one heating body comprises at least one electrical resistor, a matrix, which is made of an electrically insulating material and in which the at least one electrical resistor is embedded, and at least one electrical connector configured to connect the at least one electrical resistor to a power supply.

6. The air inlet according to claim 4, wherein the at least one heating body and the heat exchanger form a single flexible or semi-rigid plate configured to adapt to a curvature of the lip.

7. The air inlet according to claim 6, wherein the at least one secondary de-icing system extends between first and second edges, the heat exchanger extending between the first edge and a separating boundary, the at least one heating body extending between the separating boundary and the second edge, the heat exchanger having a width greater than or equal to a width of the first or second region covered by the splice plate.

8. The air inlet according to claim 7, wherein, the air inlet comprises a first secondary de-icing system interposed between the splice plate and the first panel, and a second secondary de-icing system interposed between the splice plate and the second panel.

9. The air inlet according to claim 7, wherein the secondary de-icing system comprises first and second heating bodies, which are positioned on either side of the splice plate, and at least one heat exchanger positioned between the first and second heating bodies.

10. The air inlet according to claim 1, wherein the main layer is a strip configured to convert electrical energy into thermal energy, and wherein the at least one secondary de-icing system comprises at least one electrical energy supply configured to supply electrical energy to the main layer.

11. An aircraft comprising:

at least one air inlet according to claim 1.

* * * * *